(12) United States Patent
Na et al.

(10) Patent No.: US 11,054,002 B2
(45) Date of Patent: Jul. 6, 2021

(54) PLANETARY GEARED REDUCER WITH DUAL REDUCTION RATIO

(71) Applicant: SAMBO INDUSTRIAL CO., LTD., Busan (KR)

(72) Inventors: Hyang-Guen Na, Busan (KR); Jaeyong Kang, Busan (KR); Seonghwa Kim, Busan (KR)

(73) Assignees: SAMBO INDUSTRIAL CO., LTD., Busan (KR); Hyang-Guen Na, Busan (KR)

( * ) Notice: Subject to any disclaimer, the term of this patent is extended or adjusted under 35 U.S.C. 154(b) by 1 day.

(21) Appl. No.: 16/672,986

(22) Filed: Nov. 4, 2019

(65) Prior Publication Data
US 2020/0370623 A1    Nov. 26, 2020

(30) Foreign Application Priority Data
May 22, 2019    (KR) .......................... 10-2019-0060294

(51) Int. Cl.
*F16H 3/46*        (2006.01)
*F16H 3/66*        (2006.01)

(52) U.S. Cl.
CPC ............. *F16H 3/46* (2013.01); *F16H 3/663* (2013.01); *F16H 2200/0034* (2013.01); *F16H 2200/2005* (2013.01); *F16H 2200/2007* (2013.01)

(58) Field of Classification Search
CPC ....................................................... F16H 3/64

USPC ................................................. 475/298, 300
See application file for complete search history.

(56) References Cited

U.S. PATENT DOCUMENTS

| 2,066,952 | A | * | 1/1937 | Hilding | .................... | F16H 3/54 |
| | | | | | | 475/299 |
| 2,919,774 | A | * | 1/1960 | Russell | .................... | F16H 3/78 |
| | | | | | | 192/53.34 |

FOREIGN PATENT DOCUMENTS

| KR | 20030064243 | 7/2003 |
| KR | 20110093083 | 8/2011 |
| KR | 20170041069 | 4/2017 |

* cited by examiner

*Primary Examiner* — Derek D Knight
(74) *Attorney, Agent, or Firm* — Ipla P.A.

(57) ABSTRACT

Provided is a planetary geared reducer with a dual reduction ratio. The reducer includes: a housing provided with a ring gear, and having one side where an input shaft is rotatably inserted and an opposite side where an output shaft is rotatably inserted; a sun gear provided at the input shaft; at least one planetary gear engaged between the sun gear and the ring gear; and a high reduction carrier provided at the output shaft to rotatably support the planetary gear by a rotation pin, wherein the high reduction carrier is coupled with a low reduction carrier, the low reduction carrier has a through-hole where the sun gear passes, the through-hole has a low reduction gear engaged with the sun gear, and the sun gear is selectively interlocked with the planetary or low reduction gear according to a forward or rearward movement of the input shaft to perform dual reduction.

6 Claims, 8 Drawing Sheets

PLANETARY GEARED REDUCER WITH DUAL REDUCTION RATIO

BACKGROUND OF THE INVENTION

1. Field of the Invention

The present invention relates to a reducer, and more particularly, to a planetary geared reducer with a dual reduction ratio, which has a structure capable of providing an output with different reduction ratios for one input.

2. Description of the Related Art

In general, various devices such as machine tools, washing machines, and automobiles require reducers that use various gears to vary a rotation ratio. The reducer is a device that receives a rotational force from a power source such as a motor that rotates at a considerable speed and converts the received rotational force to have a low speed in order to output the low-speed rotational force, in which an assembly of various types of gears is used in the reducer.

Among the reducers, a reducer that increases the power transmission efficiency by reducing a load and a speed transmitted from an input shaft to an output shaft by using planetary gears is widely used in every fields of industry such as shipbuilding, offshore plants, power plants, and industrial plants.

In particular, such a reducer is frequently used for actuators such as valves and valve gearboxes, and the reducer is important when opening, closing, or operating a valve.

FIG. 1 is a sectional view showing the structure of a reducer using a planetary gear according to the related art.

As shown in the drawing, the reducer according to the related art includes: a gear housing having an internal gear; an input shaft having one end connected to a motor shaft and an opposite end inserted into an input side of the gear housing; a sun gear coupled to the opposite end of the input shaft; a plurality of planetary gears simultaneously engaged with the sun gear and the internal gear of the gear housing; and a rotation plate provided at a lower portion thereof with a plurality of connection pins which are fitted to centers of the planetary gears, and provided at an upper center thereof with an output shaft.

With such a configuration, when the input shaft is rotated by receiving a rotational force from a motor, the planetary gears engaged with the input shaft rotate around the input shaft while rotating on their axes, and the rotation plate rotates at a rotation speed of the planetary gear rotating around the input shaft, so that the rotational force is output through the output shaft after being reduced.

However, since the reducer according to the related art has a simple configuration but has only one reduction rotation ratio, two or more types of reduction ratios may not be realized.

In addition, in order to provide two or more types of reduction ratios, the structure becomes very complicated and bulky, and in particular, an output shaft corresponding to each of the reduction ratios has to be provided separately.

In the case of a valve, a large torque is required at the start and end of a stroke during opening and closing of the valve, so it is necessary to increase the reduction ratio at the start and end of the stroke. However, the large torque is not required in the middle of the stroke, so it is necessary to increase an operating speed by reducing the reduction ratio.

As a result, the reducer according to the related art could not satisfy such demands at all.

DOCUMENTS OF RELATED ART (Patent document 0001) Korean Patent Registration No. 10-0428653 (2004 Apr. 12) "Reduction Gear Apparatus for Generating Multiple Outputs"

(Patent document 0002) Korean Unexamined Patent Publication No. 10-2017-0041069 (2017 Apr. 14) "EGR Valve Including Planetary Gear"

(Patent document 0003) Korean Patent Registration No. 10-1165075 (2012 Jul. 5) "Driving Device with Dual Output Shaft"

SUMMARY OF THE INVENTION

Accordingly, to solve the problems described above, one object of the present invention is to provide a planetary geared reducer with a dual reduction ratio, which has a structure capable of selectively providing an output with different reduction ratios for one rotation speed input.

Another object of the present invention is to provide a planetary geared reducer with a dual reduction ratio, which has a structure in which one output shaft may provide an output with different reduction ratios, and an input shaft and the output shaft may be concentric with each other.

To achieve the objects described above, according to the present invention, there is provided a planetary geared reducer with a dual reduction ratio, the planetary geared reducer including: a housing having a cylindrical shape, provided on an inner circumferential surface thereof with a ring gear in a form of an internal gear, and having one side into which an input shaft is rotatably inserted and an opposite side into which an output shaft is rotatably inserted; a sun gear provided at an end of the input shaft; at least one planetary gear engaged between the sun gear and the ring gear; and a high reduction carrier provided at an end of the output shaft to rotate and configured to rotatably support the planetary gear by a rotation pin, wherein the high reduction carrier is coupled with a low reduction carrier for covering the planetary gear to accommodate the planetary gear therein, the low reduction carrier has a through-hole through which the sun gear passes, the through-hole is provided on an inner circumferential surface thereof with a low reduction gear in a form of an internal gear which is engaged with the sun gear, and the sun gear is selectively interlocked with the planetary gear or the low reduction gear according to a forward or rearward movement of the input shaft to perform dual reduction.

In this case, a guide rod may protrude from a center of the high reduction carrier, the input shaft may be formed at a center thereof with a guide hole into which the guide rod is inserted, and centers of the guide rod and the guide hole may match centers of the input shaft and the output shaft to guide a movement of the input shaft.

In this case, the planetary geared reducer may further include a restoration spring provided between the guide hole and the guide rod to move the input shaft rearward.

In addition, the input shaft may be formed at an outer circumference thereof with a latching groove, and the housing may be provided on one side thereof with a latching pin which is inserted into the latching groove.

In addition, the latching pin may be elastically supported by a latching spring.

Meanwhile, the planetary geared reducer may further include a first reduction device mounted between the high reduction carrier and the low reduction carrier, and the first reduction device may include: a first sun gear engaged with the planetary gear; a first reduction carrier spline-coupled to the first sun gear; at least one first planetary gear rotatably coupled to the first reduction carrier by a first rotation pin and engaged with the sun gear; and a first housing coupled between an input side housing and an output side housing divided from the housing, and provided on an inner circumferential surface thereof with a first ring gear engaged with the first planetary gear, wherein the first rotation pin may be coupled to the low reduction carrier, and the rotation pin may be coupled with a first auxiliary carrier for preventing the planetary gear from being separated.

In this case, the planetary geared reducer may further include a second reduction device mounted between the first reduction device and the low reduction carrier and having a configuration identical to a configuration of the first reduction device.

According to the present invention having the above-described configuration, first, while two types of reduction ratios are provided, the structure is simple and has a small volume, so that miniaturization and weight lightening can be achieved.

Second, when the present invention is applied to the opening and closing of a valve, a high reduction ratio is selected at the start and end of the opening and closing to generate a large torque, so that the opening and closing can be smoothly performed, and since the large torque is not required in the middle of the opening and closing, a low reduction ratio is selected to increase the operating speed without the large torque, so that the opening and closing can be rapidly performed.

DETAILED DESCRIPTION OF THE INVENTION

Hereinafter, one embodiment according to the present invention will be described in detail with reference to the accompanying drawings.

For reference, the description with reference to the drawings is provided for better understanding of the present invention, so the scope of the present invention is not limited thereto. In addition, throughout the description of the present invention, when the detailed description of a relevant generally-known technology is determined to unnecessarily obscure the subject matter of the present invention, the pertinent detailed description will be omitted.

Figure 1:
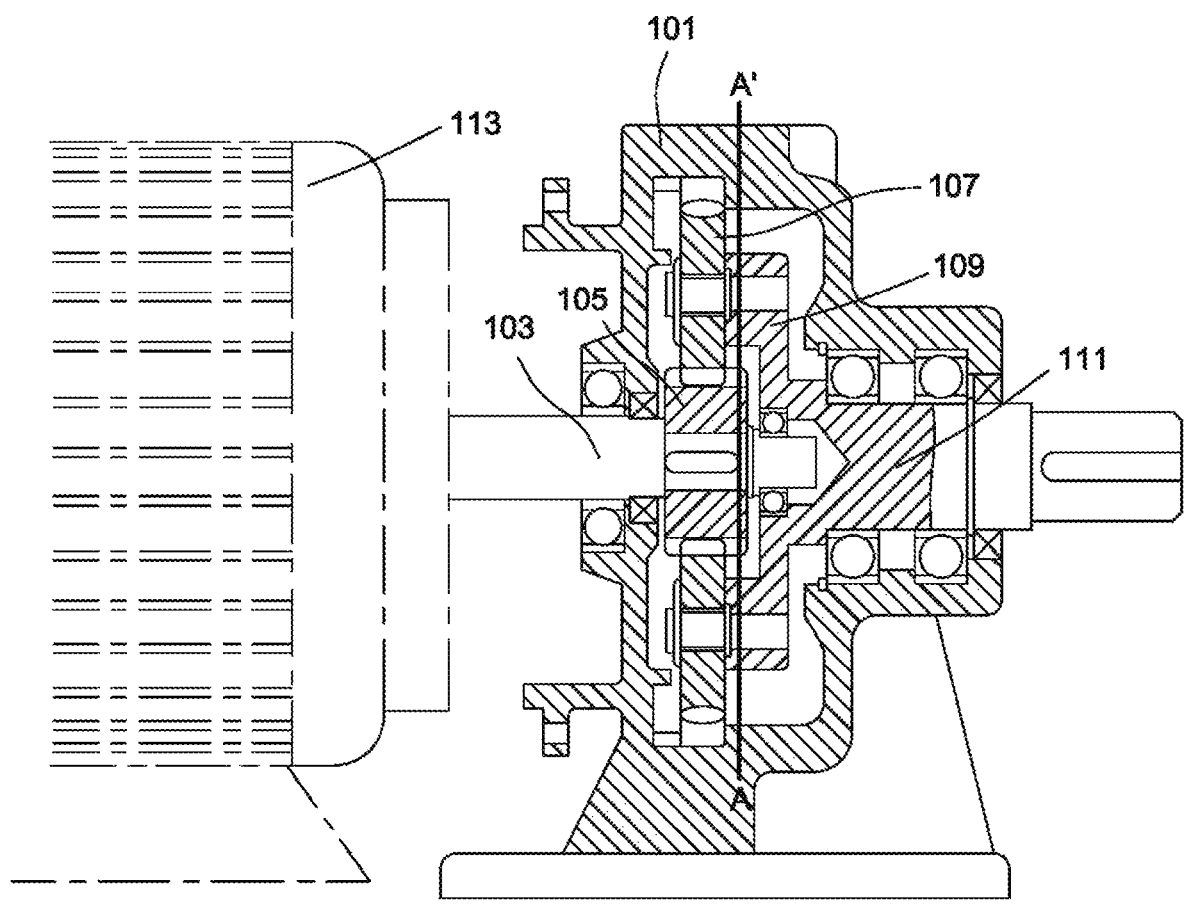
FIG. 1 is a sectional view showing the structure of a reducer using a planetary gear according to the related art.
Figure 2:
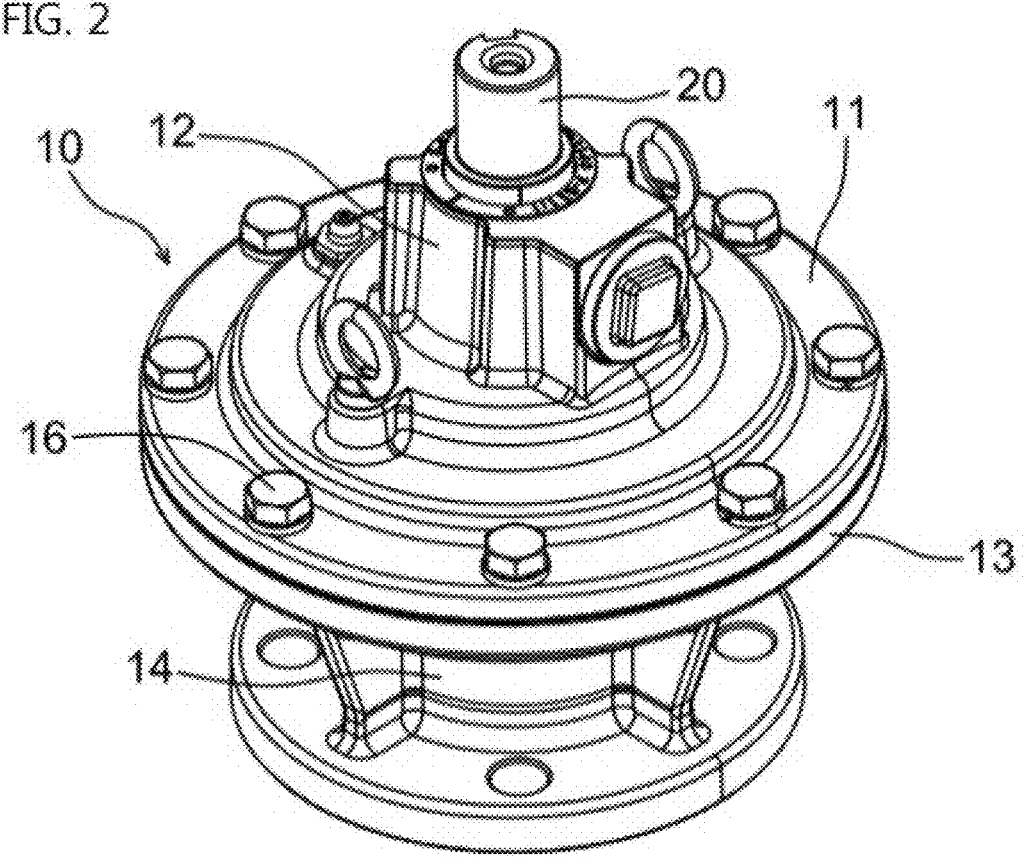
FIG. 2 is a perspective view showing an entire exterior of a planetary geared reducer with a dual reduction ratio according to one embodiment of the present invention.
Figure 3:
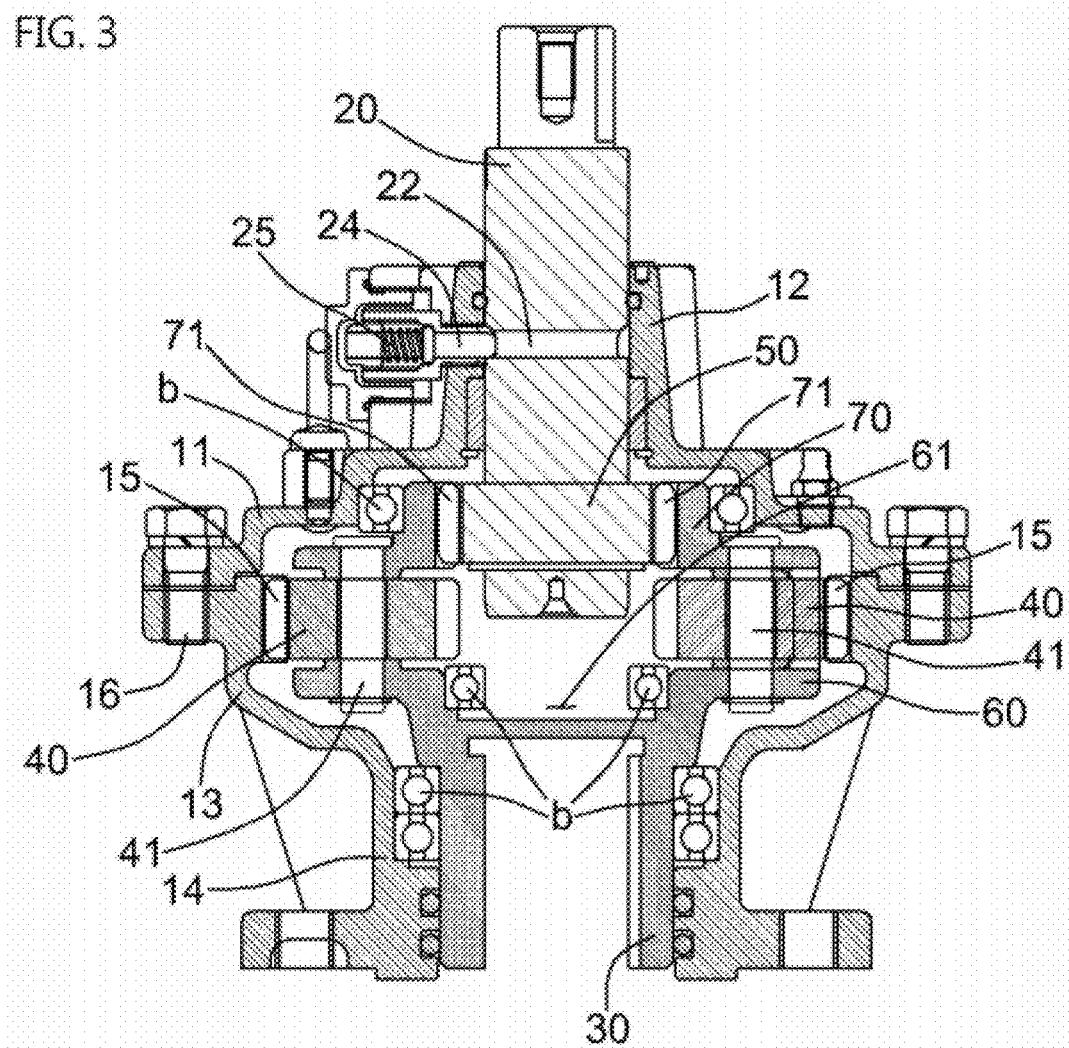
FIG. 3 is a longitudinal sectional view of the present invention shown in FIG. 2.

FIG. 2 is a perspective view showing an entire exterior of a planetary geared reducer with a dual reduction ratio according to one embodiment of the present invention, and FIG. 3 is a longitudinal sectional view of the present invention shown in FIG. 2.

The present invention is a device such as a gearbox in which a rotational force is reduced when the rotational force is input to an input shaft by a power source such as a motor (not shown) so as to output the reduced rotational force to an output shaft.

One embodiment of the present invention may generally include a housing 10, an input shaft 20, an output shaft 30, a planetary gear 40, a sun gear 50, a high reduction carrier 60, and a low reduction carrier 70.

First, the housing 10 will be described.

The housing 10 may accommodate and support the input shaft 20, the output shaft 30, the planetary gear 40, the sun gear 50, the high reduction carrier 60, and the low reduction carrier 70.

The housing 10 may have a substantially cylindrical shape, and may be divided into an input side housing 11 and an output side housing 13 so as to be disassembled and assembled.

In this case, the input side housing 11 and the output side housing 13 may be fastened to each other at edges thereof by a plurality of fastening bolts 16.

In addition, the input side housing 11 may have an input port 12 into which the input shaft 20 is inserted, and the output side housing 13 may have an output port 14 into which the output shaft 30 is inserted.

Further, a ring gear 15, which is an internal gear, may be provided on an inner circumferential surface of the housing 10. Preferably, the ring gear 15 may be provided on an inner circumferential surface of the output side housing 13.

Next, the input shaft 20 and the output shaft 30 will be described.

The input shaft 20 may be inserted into the input port of the housing 10 and rotated by various power sources.

A bushing and an O-ring may be inserted between the input shaft 20 and the input port 12 so that the input shaft 20 may be rotatable, and a sealing effect may be achieved. In addition, the input shaft 20 may be slidably operated to move forward or rearward along the input port 12.

The output shaft 30 may be rotatably inserted into the output port 14 of the housing 10.

To this end, a bearing b may be provided between the output shaft 30 and the output port 14, and an O-ring may be provided between the output shaft 30 and the output port 14 for the sealing effect. In addition, the output shaft 30 may have a hollow structure or a solid structure.

Next, the sun gear 50 and the planetary gear 40 will be described.

The sun gear 50 may be coupled to an end of the input shaft 20 to rotate by the rotation of the input shaft 20. The sun gear 50 may be formed at an outer circumference thereof with gear teeth.

In addition, at least one planetary gear 40 may be engaged around an outer side of the sun gear 50.

Generally, two to four planetary gears 40 may be arranged at regular intervals, and may be interlocked with each other by the rotation of the sun gear 50 so as to be rotated in the same direction at the same speed.

In addition, each of the planetary gears 40 may be engaged with the ring gear.

Therefore, since the planetary gears 40 are rotated when the sun gear 50 rotates, and the planetary gears 40 are interlocked with the ring gear 15, the planetary gears 40 may also move along the ring gear 15 in a circular trajectory. As a result, the planetary gears 40 may rotate around the sun gear 50 while rotating on their axes.

In this case, each of the planetary gears 40 may be rotatably fixed on the high reduction carrier 60 and the low reduction carrier 70, which will be described below, by an additional rotation pin 41.

Next, the high reduction carrier 60 and the low reduction carrier 70 will be described.

The high reduction carrier 60 may be coupled to or provided at an end of the output shaft 30 to rotate together with the output shaft 30.

The high reduction carrier 60 may substantially have a disc shape, and may be formed at a center thereof with a seating groove 61 into which the end of the input shaft 20 may be inserted. In addition, the seating groove 61 may be provided therein with a bearing b for rotatably supporting the input shaft 20 having the end inserted into the seating groove 61.

In addition, rotation pins 41 may be vertically fixed to the high reduction carrier 60 at regular intervals in a circumferential direction, and the planetary gears 40 may be rotatably coupled to and supported by the rotation pins 41, respectively.

Therefore, the high reduction carrier 60 may be rotated as the planetary gears 40 rotate, and thus the output shaft 30 may also be rotated.

Meanwhile, the low reduction carrier 70 may be coupled to the high reduction carrier 60 by the rotation pin 41 so as to accommodate the planetary gears 40 therein. Therefore, as the planetary gears 40 rotate, the low reduction carrier 70 may also be rotated together with the high reduction carrier 60.

For reference, the bearing b may be interposed between the low reduction carrier 70 and the input side housing 11.

The low reduction carrier 70 may be formed at a center thereof with a through-hole, and the through-hole may be provided on an inner circumferential surface thereof with a low reduction gear 71 in the form of an internal gear.

In this case, the low reduction gear 71 may be engaged with the sun gear 50. Therefore, the rotational force of the sun gear 50 may be transmitted to the low reduction carrier 70, and thus the high reduction carrier 60 and the output shaft 30 may be rotated.

For example, when the sun gear 50 is engaged with the low reduction gear 71 and rotates while the input shaft 20 is moved rearward, the output shaft 30 may be rotated at the same speed as the input shaft 20 through the low reduction carrier 70 and the high reduction carrier 60. In other words, the same speed may be transferred without any reduction (reduction ratio of 1:1).

However, when the input shaft 20 is moved forward so that the sun gear 50 is engaged with the planetary gears 40 to rotate, the output shaft 30 may rotate at a lower speed than the input shaft 20 through the planetary gears 40, the ring gear 15, and the high reduction carrier 60. That is, the reduction may be performed at a reduction ratio of N:1.

In other words, the sun gear 50 may be selectively interlocked with the planetary gears 40 or the low reduction gear 71 according to a forward or rearward movement of the input shaft 20 to perform dual reduction.

Figure 4:
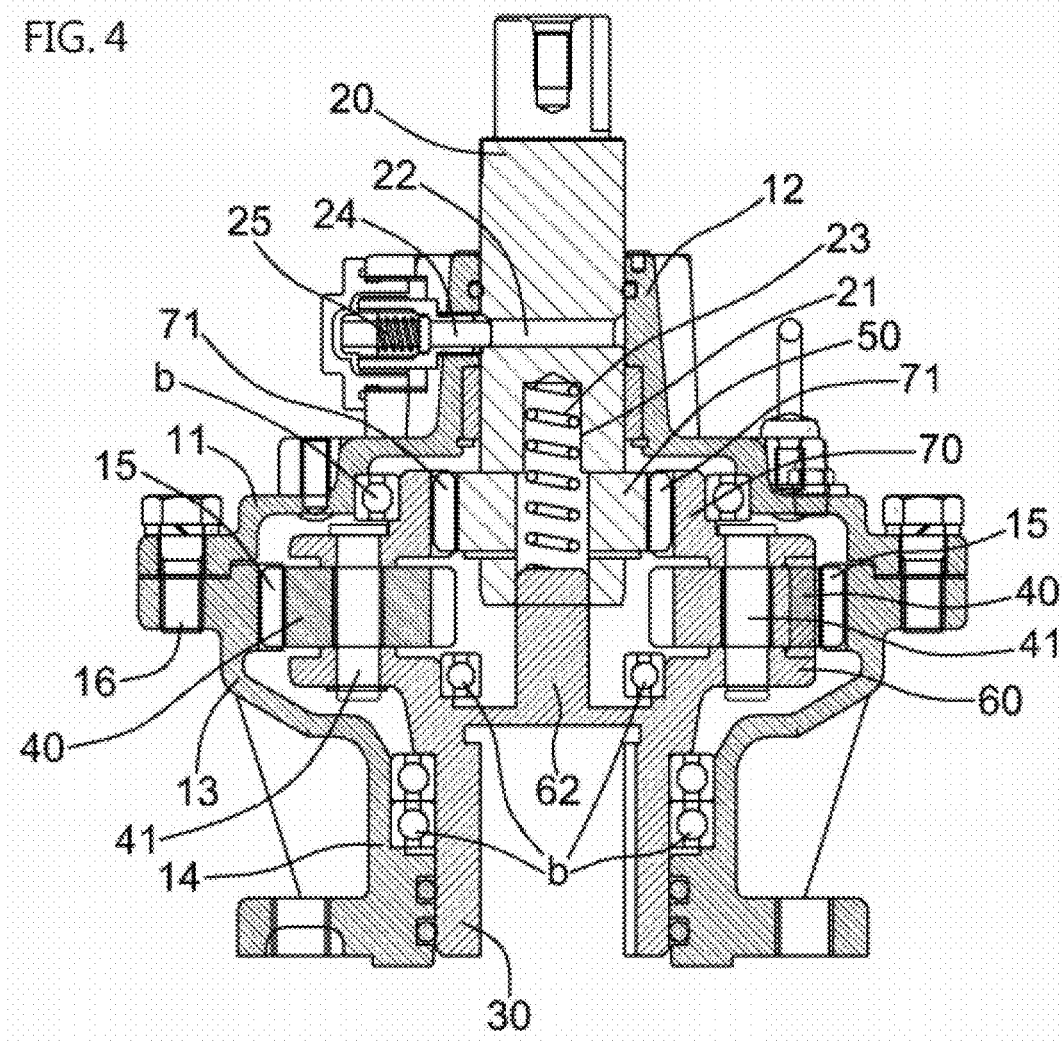
FIG. 4 is a sectional view showing a planetary geared reducer with a dual reduction ratio according to another embodiment of the present invention.
Figure 5:
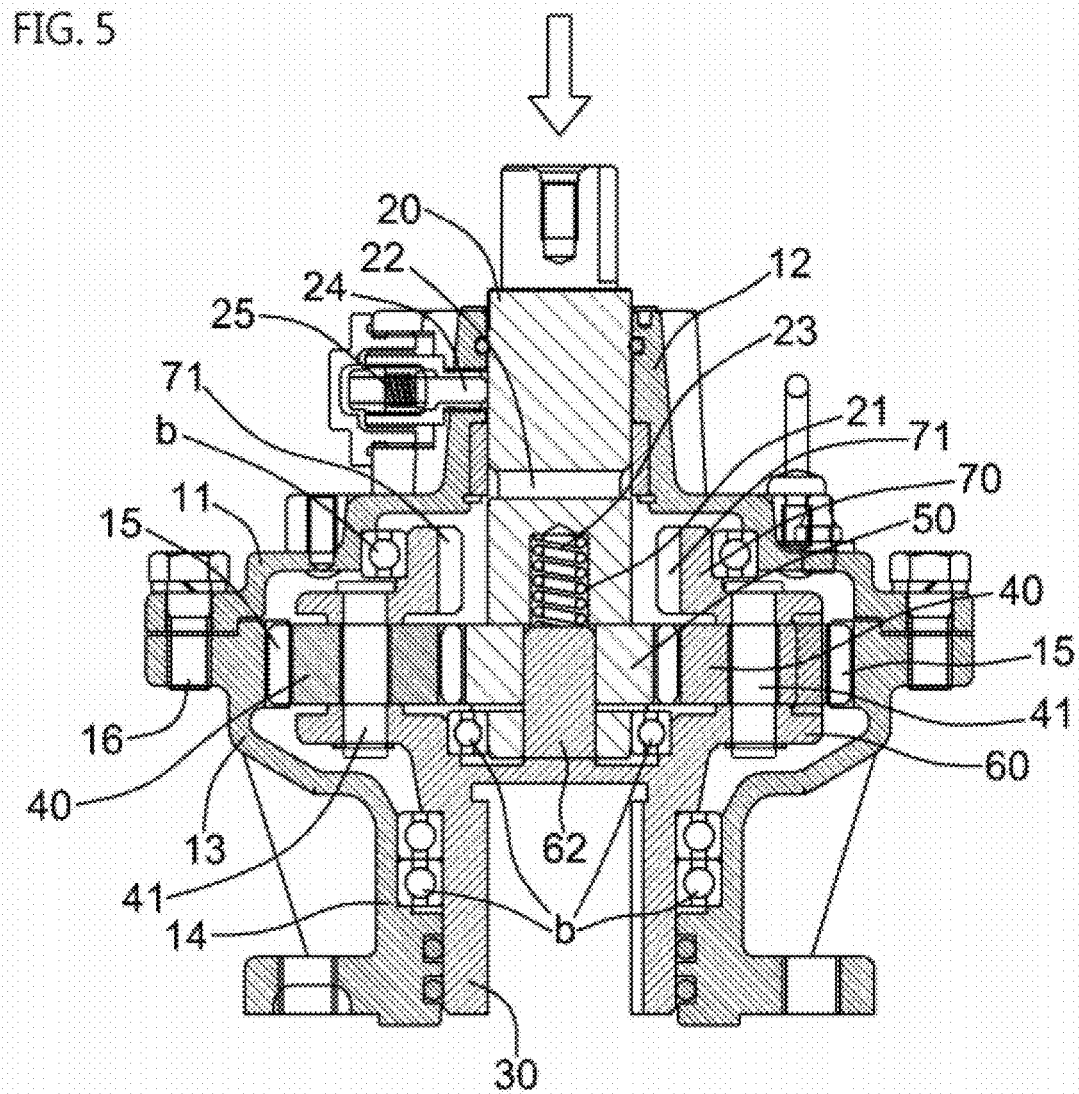
FIG. 5 is a view showing an operating state of the present invention shown in FIG. 4.

In the following, another embodiment of the present invention will be described with reference to FIGS. 4 and 5. FIG. 4 is a sectional view showing a planetary geared reducer with a dual reduction ratio according to another embodiment of the present invention, and FIG. 5 is a view showing an operating state of the present invention shown in FIG. 4.

Another embodiment of the present invention has a structure in which the input shaft 20 is elastically supported so that the input shaft 20 may smoothly move rearward in a state where the input shaft 20 is moved forward.

To this end, a guide rod 62 having a protruding shape may be provided at an inner center of the high reduction carrier 60.

In addition, a guide hole 21 may be formed at a center of the end of the input shaft 20.

In this case, the guide rod 62 is processed so that the guide rod 62 may be inserted into the guide hole 21.

Therefore, the input shaft 20 may be slidable concentrically with the output shaft 30 when the input shaft 20 moves forward or rearward.

However, the guide hole 21 is provided with a restoration spring 23.

The restoration spring 23 may be a compression spring, and may have one end seated on an upper end of the guide rod 62. Therefore, when the input shaft 20 is pushed to move forward by an external force, the guide rod 62 may be inserted into the guide hole 21 while compressing the restoration spring 23 so that the sun gear 50 may be interlocked with the planetary gears 40.

On the contrary, when the external force is removed, the input shaft 20 may be pushed rearward by an elastic force of the restoration spring 23 so that the sun gear 50 may be interlocked with the low reduction gear 71.

In addition, latching grooves 22 may be formed continuously on an outer peripheral portion of the input shaft 20 in the circumferential direction.

Further, a latching pin 24 may pass through one side of the housing 10, particularly, may be provided on the input port 12. A front end of the latching pin 24 may be inserted into the latching groove 22, and a rear end of the latching pin 24 may be elastically supported by a latching spring 25.

Therefore, when the input shaft 20 moves forward, the latching pin 24 may be pushed out and separated from the latching groove 22, and when the input shaft 20 moves rearward, the latching pin 24 may be latched to the latching groove 22 so that the input shaft 20 may not be moved rearward further.

When the present invention is used for opening and closing a valve, in the middle of a stroke where a large torque is not required, the sun gear 50 may be interlocked with the low reduction gear 71 in a state in which the input shaft 20 is moved rearward, so that the output shaft 30 may be rapidly rotated at the same speed as an input speed.

However, since a large torque is required at the start and end of the stroke during the opening and closing of the valve, it is necessary to increase the reduction ratio. Therefore, the input shaft 20 may be moved forward to allow the sun gear 50 to be interlocked with the planetary gears 40, so that the output shaft 30 may be greatly decelerated.

Figure 6:
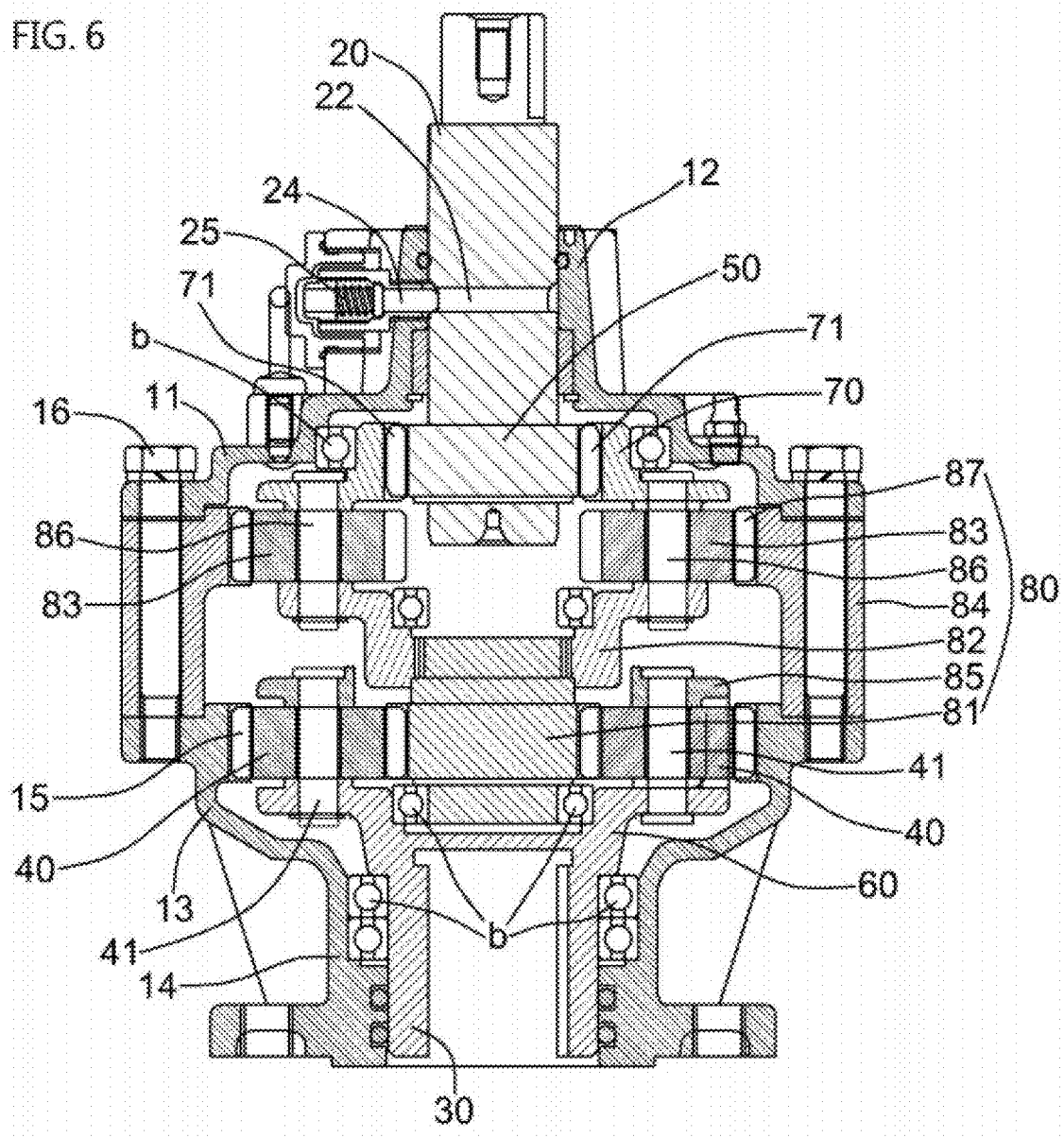
FIG. 6 is a sectional view showing the structure of a planetary geared reducer with a dual reduction ratio according to still another embodiment of the present invention.
Figure 7:
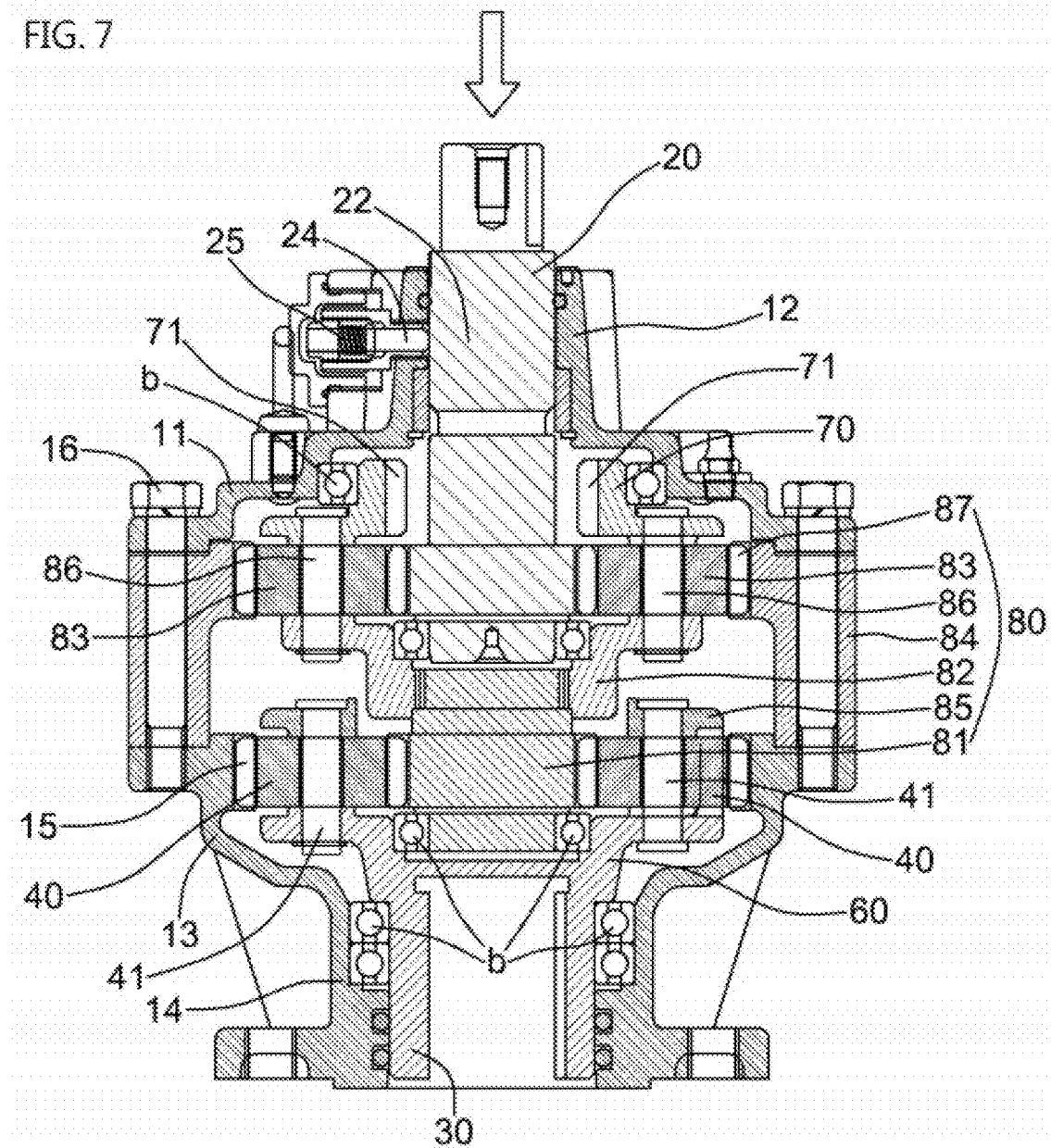
FIG. 7 is a view showing an operating state of the present invention shown in FIG. 6.

In the following, still another embodiment of the present invention will be described with reference to FIGS. 6 and 7. FIG. 6 is a sectional view showing the structure of a planetary geared reducer with a dual reduction ratio according to still another embodiment of the present invention, and FIG. 7 is a view showing an operating state of the present invention shown in FIG. 6.

Still another embodiment of the present invention is for proposing a reducer with a larger reduction ratio, and has a structure in which a first reduction device 80 is additionally mounted between the high reduction carrier 60 and the low reduction carrier 70. In this case, in order to additionally provide the first reduction device 80, the input side housing 11 and the output side housing 13 may be separated to mount and connect the first reduction device 80 therebetween.

In detail, the first reduction device 80 may include a first sun gear 81, a first reduction carrier 82, a first planetary gear 83, a first housing 84, and a first auxiliary carrier 85.

The first sun gear 81 may be provided at an outer circumference thereof with gear teeth, and engaged with the planetary gear 40.

The first sun gear 81 may have one end seated in the seating groove of the high reduction carrier 60 so as to be supported, and an opposite end provided with a spline so as to be spline-coupled to the first reduction carrier 82.

The first reduction carrier 82 may have a structure and a shape similar to the structure and the shape of the high reduction carrier 60.

An opposite end of the first sun gear 81 may be inserted into a center of the first reduction carrier 82 in one direction so as to be spline-coupled, and the end of the input shaft 20 may be inserted into the center of the first reduction carrier 82 in an opposite direction so as to be seated.

In this case, in order to rotatably support the end of the input shaft 20, the bearing b may be interposed between the first reduction carrier 82 and the input shaft 20.

One or more first planetary gears 83 may be arranged on the first reduction carrier 82 in the circumferential direction. Each of the first planetary gears 83 may be rotatably fixed by a first rotation pin 86.

In addition, each of the first planetary gears 83 may be engaged with the sun gear 50 so that the first planetary gears 83 may rotate in the same direction at the same speed by the rotation of the sun gear 50.

The first housing 84 may be provided around outer sides of the first planetary gears 83.

The first housing 84 may be formed on an inner circumferential surface thereof with a first ring gear 87 engaged with the first planetary gears 83. The first ring gear 87 may be in the form of an internal gear.

In order to mount the first housing 84, the input side housing 11 and the output side housing 13 may be separated, and the first housing 84 may be assembled and fastened between the input side housing 11 and the output side housing 13.

In addition, one ends of the first rotation pins 86 may be fixed to the first reduction carrier 82, and opposite ends of the first rotation pins 86 may be fixed to the low reduction carrier 70, so that the first reduction carrier 82 and the low reduction carrier 70 may rotate together.

For reference, a separate first auxiliary carrier 85 may be coupled to an opposite end of the rotation pin 41 that has one end fixed to the high reduction carrier 60 so as to rotate together with the high reduction carrier 60 while preventing the planetary gear 40 from being separated.

Referring to an operating state, when the input shaft 20 is moved rearward so that the sun gear 50 is interlocked with the low reduction gear 71, the low reduction carrier 70 and the first reduction carrier 82 may rotate together without reduction.

When the first reduction carrier 82 rotates, the first sun gear 81 spline-coupled to the first reduction carrier 82 may be rotated, and when the first sun gear 81 rotates, the planetary gear may rotate while the high reduction carrier 60 and the output shaft may be decelerated and rotated at the reduction ratio of N:1.

If the sun gear 50 is interlocked with the first planetary gear 83 by moving the input shaft 20 forward, the first planetary gear 83 may rotate while the first reduction carrier 82 and the first sun gear 81 may be primarily decelerated and rotated at the reduction ratio of N:1.

In addition, the planetary gear 40 may rotate by the rotation of the first sun gear 81 while the high reduction carrier 60 and the output shaft 30 may be secondarily decelerated and rotated at the reduction ratio of N:1.

As a result, by further providing the first reduction device 80, the output shaft 30 may be greatly decelerated and rotated with respect to the input shaft 20 at a reduction ratio of N×N:1.

Figure 8:
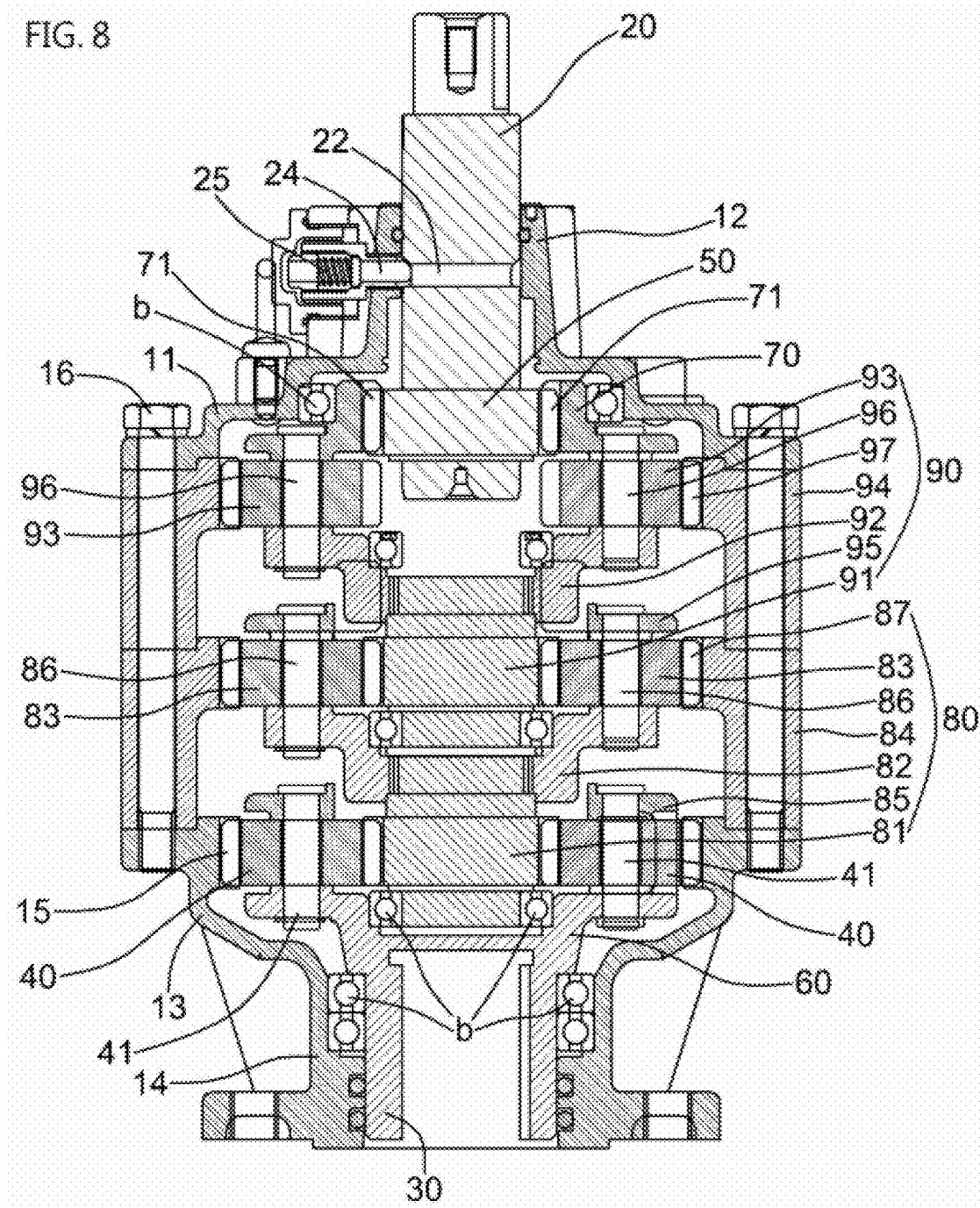
FIG. 8 is a sectional view showing the structure of a planetary geared reducer with a dual reduction ratio according to yet another embodiment of the present invention.

In the following, yet another embodiment of the present invention will be described with reference to FIG. 8. FIG. 8 is a sectional view showing the structure of a planetary geared reducer with a dual reduction ratio according to yet another embodiment of the present invention.

Yet another embodiment of the present invention has a structure in which a second reduction device 90 is additionally mounted between the first reduction device 80 and the low reduction carrier 70 to implement a larger reduction ratio.

Preferably, the second reduction device 90 may have the same configuration as the first reduction device 80.

In other words, the second reduction device 90 may include a second sun gear 91, a second reduction carrier 92, a second planetary gear 93, a second housing 94, and a second auxiliary carrier 95.

The second sun gear 91, the second reduction carrier 92, the second planetary gear 93, the second housing 94, and the second auxiliary carrier 95 may have the same structure and shape as the first sun gear 81, the first reduction carrier 82, the first planetary gear 83, the first housing 84, and the first auxiliary carrier 85, respectively.

In this case, the second sun gear 91 may be engaged with the first planetary gear 83, and may have one end seated and supported by the first reduction carrier 82 and an opposite end provided with a spline so as to be spline-coupled to the second reduction carrier 92.

An opposite end of the second sun gear 91 may be inserted into a center of the second reduction carrier 92 in one direction so as to be spline-coupled, and the end of the input shaft 20 may be inserted into the center of the second reduction carrier 92 in the opposite direction so as to be seated.

In this case, in order to rotatably support the end of the input shaft 20, the bearing b may be interposed between the second reduction carrier 92 and the input shaft 20.

Second planetary gears 93 may be arranged on the second reduction carrier 92, and each of the second planetary gears 93 may be rotatably fixed by a second rotation pin 96. Each of the second planetary gears 93 may be engaged with the sun gear 50.

The second housing 94 may be provided on an outer side of the second planetary gear 93, and the second housing 94 may be provided on an inner circumferential surface thereof with a second ring gear 97 engaged with the second planetary gears 93.

In order to mount the second housing 94, the input side housing 11 and the first housing 84 may be separated, and the second housing 94 may be assembled and fastened between the input side housing 11 and the first housing 84.

In addition, one ends of the second rotation pins 96 may be fixed to the second reduction carrier 92, and opposite ends of the second rotation pins 96 may be fixed to the low reduction carrier 70, so that the second reduction carrier 92 and the low reduction carrier 70 may rotate together.

Further, a separate second auxiliary carrier 95 may be coupled to an opposite end of the first rotation pin 96 that has one end fixed to the first reduction carrier 82 so as to rotate together with the first reduction carrier 82 while preventing the first planetary gear 83 from being separated.

In this case, the output shaft 30 may be decelerated and rotated at the reduction ratio of N×N:1 in the state in which the input shaft 20 is moved rearward, and the output shaft 30 may be decelerated and rotated at a reduction ratio of N×N×N:1 in the state in which the input shaft 20 is moved forward.

In this manner, a third reduction device, a fourth reduction device, and the like may be additionally mounted, and the reduction ratio may be gradually lowered each time the reduction device is additionally provided.

Although exemplary embodiments of the present invention have been described above with reference to the drawings, various applications and modifications may be made by those skilled in the art within the scope of the present invention based on the above contents. Therefore, the scope of the present invention should not be limited to the embodiments described above, but should be defined by the appended claims as well as equivalents thereof.

What is claimed is:

1. A planetary geared reducer with a dual reduction ratio, the planetary geared reducer comprising:
    a housing having a cylindrical shape, provided on an inner circumferential surface thereof with a ring gear in a form of an internal gear, and having one side into which an input shaft is rotatably inserted and an opposite side into which an output shaft is rotatably inserted;
    a sun gear provided at an end of the input shaft;
    at least one planetary gear engaged between the sun gear and the ring gear; and
    a high reduction carrier provided at an end of the output shaft to rotate and configured to rotatably support the planetary gear by a rotation pin,
    wherein the high reduction carrier is coupled with a low reduction carrier for covering the planetary gear to accommodate the planetary gear therein,
    the low reduction carrier has a through-hole through which the sun gear passes,
    the through-hole is provided on an inner circumferential surface thereof with a low reduction gear in a form of an internal gear which is engaged with the sun gear, and
    the sun gear is selectively interlocked with the planetary gear or the low reduction gear according to a forward or rearward movement of the input shaft to perform dual reduction,
    wherein a guide rod protrudes from a center of the high reduction carrier, the input shaft is formed at a center thereof with a guide hole into which the guide rod is inserted, and centers of the guide rod and the guide hole match centers of the input shaft and the output shaft to guide a movement of the input shaft.

2. The planetary geared reducer of claim 1, further comprising a restoration spring provided between the guide hole and the guide rod to move the input shaft rearward.

3. The planetary geared reducer of claim 2, wherein the input shaft is formed at an outer circumference thereof with a latching groove, and
    the housing is provided on one side thereof with a latching pin which is inserted into the latching groove.

4. The planetary geared reducer of claim 3, wherein the latching pin is elastically supported by a latching spring.

5. The planetary geared reducer of claim 1, further comprising a first reduction device mounted between the high reduction carrier and the low reduction carrier,
    wherein the first reduction device includes:
        a first sun gear engaged with the planetary gear;
        a first reduction carrier spline-coupled to the first sun gear;
        at least one first planetary gear rotatably coupled to the first reduction carrier by a first rotation pin and engaged with the sun gear; and
        a first housing coupled between an input side housing and an output side housing divided from the housing, and provided on an inner circumferential surface thereof with a first ring gear engaged with the first planetary gear,
    the first rotation pin is coupled to the low reduction carrier, and
    the rotation pin is coupled with a first auxiliary carrier for preventing the planetary gear from being separated.

6. The planetary geared reducer of claim 5, further comprising a second reduction device mounted between the first reduction device and the low reduction carrier and having a configuration identical to a configuration of the first reduction device.

* * * * *